(12) United States Patent
Barringer et al.

(10) Patent No.: US 7,127,791 B2
(45) Date of Patent: Oct. 31, 2006

(54) SPLIT NUT FOR USE WITH A ROD HAVING DUAL DIRECTIONAL SCREW THREADS ABOUT A COMMON DIAMETER

(75) Inventors: Dennis R. Barringer, Wallkill, NY (US); Justin C. Rogers, Poughkeepsie, NY (US); Harold M. Toffler, Newburgh, NY (US)

(73) Assignee: International Business Machines Corporation, Armonk, NY (US)

( * ) Notice: Subject to any disclaimer, the term of this patent is extended or adjusted under 35 U.S.C. 154(b) by 387 days.

(21) Appl. No.: 10/725,780

(22) Filed: Dec. 2, 2003

(65) Prior Publication Data

US 2005/0115342 A1    Jun. 2, 2005

(51) Int. Cl.
*B23P 19/00* (2006.01)
*F16B 37/16* (2006.01)

(52) U.S. Cl. .......................... 29/456; 29/434; 411/437; 411/539; 74/89.23; 74/424.78; 74/424.94; 403/343

(58) Field of Classification Search ............... 29/456, 29/434, 469; 74/89.23, 89.3, 424.71, 424.78, 74/424.94; 403/343, 345, 362; 411/437, 411/539
See application file for complete search history.

(56) References Cited

U.S. PATENT DOCUMENTS

| | | | |
|---|---|---|---|
| 781,571 A * | 1/1905 | Thomas | 411/437 |
| 1,375,781 A * | 4/1921 | De Long | 411/437 |
| 1,722,783 A * | 7/1929 | Basseches | 411/437 |
| 2,386,296 A * | 10/1945 | De Fazi | 76/4 |
| 2,931,264 A * | 4/1960 | Dallman | 411/366.1 |
| 3,431,623 A * | 3/1969 | Gerard | 29/240 |
| 3,501,995 A * | 3/1970 | Lanius, Jr. | 411/437 |
| 3,842,690 A * | 10/1974 | Gulick | 74/625 |
| 4,023,431 A * | 5/1977 | Pavlas | 74/424.94 |
| 4,990,044 A * | 2/1991 | Kimak | 411/427 |
| 5,052,430 A * | 10/1991 | Trautwein | 137/315.35 |
| 5,074,731 A * | 12/1991 | Schneider | 411/437 |
| 5,588,796 A * | 12/1996 | Ricco et al. | 414/741 |
| 5,852,949 A | 12/1998 | Cartensen | 74/424.8 A |

(Continued)

FOREIGN PATENT DOCUMENTS

GB    2239070 A  *  6/1991

*Primary Examiner*—Essama Omgba
(74) *Attorney, Agent, or Firm*—Lily Neff; Floyd A. Gonzalez

(57) ABSTRACT

A docking apparatus for printed circuit boards including a cassette housing defining a housing cavity for containing a printed circuit board (PCB) and a linkage mechanism associated with the cassette housing. The linkage mechanism includes a linkage arm pivotally connected to the cassette housing via a pivot and has a first arm pivotally connected to the PCB, a traveler having a threaded bore therethrough connected to a second arm extending from the first arm, a shaft threadedly engaged in the left handed threaded bore through the traveler at a first end defining the shaft, the first end configured to operably transfer axial translation of the shaft to the traveler, and an opposite second end defining the shaft threaded engaged in a right handed threaded bore through a split nut operably secured to the cassette housing. The traveler and nut are configured to threadably receive corresponding threads of the shaft for axial translation of the shaft therethrough, wherein rotation of the shaft translates the shaft causing rapid pivotal movement of the linkage arm about the pivot via the traveler and nut, causing translation of the PCB in and out of engagement with a corresponding connector.

8 Claims, 10 Drawing Sheets

U.S. PATENT DOCUMENTS

| | | | |
|---|---|---|---|
| 5,888,012 A * | 3/1999 | Nygren et al. | 403/13 |
| 6,014,906 A * | 1/2000 | Stump | 74/424.71 |
| 6,146,076 A * | 11/2000 | Bodin | 411/433 |
| 6,202,500 B1 * | 3/2001 | Erikson et al. | 74/89.42 |
| 6,406,322 B1 | 6/2002 | Barringer et al. | 439/377 |
| 6,415,673 B1 * | 7/2002 | Erikson et al. | 74/89.42 |
| 6,418,807 B1 * | 7/2002 | Gladen | 74/89.33 |
| 6,422,101 B1 * | 7/2002 | Erikson et al. | 74/89.42 |
| 6,467,362 B1 * | 10/2002 | Erikson et al. | 74/89.36 |
| 6,493,235 B1 | 12/2002 | Barringer et al. | 361/756 |
| 6,529,383 B1 | 3/2003 | Barringer et al. | 361/754 |
| 6,608,759 B1 | 8/2003 | Barringer et al. | 361/759 |
| 6,971,893 B1 * | 12/2005 | Barringer et al. | 439/157 |

* cited by examiner

SPLIT NUT FOR USE WITH A ROD HAVING DUAL DIRECTIONAL SCREW THREADS ABOUT A COMMON DIAMETER

FIELD OF THE INVENTION

The present invention relates generally to a docking cassette for printed circuit boards and more specifically to a split nut for use with a docking mechanism having a rod with dual directional screw threads about a common diameter.

BACKGROUND OF THE INVENTION

As integrated circuit (IC) and printed circuit board (PCB) design and fabrication techniques become more sophisticated, computer system design techniques must also become more sophisticated. This is because as IC's and PCB's become more densely populated, their performance capabilities and speeds increase and computer systems which employ these IC's and PCB's must be able to support the increase in performance. In addition, as businesses that employ these computer systems and components become more sophisticated, they demand greater performance from their computer systems resulting in increasingly densely populated PCB's and computer systems having tightly packed packages. As a result of these tightly packed packages, these PCB's and computer systems are susceptible to a variety of problems which must be considered.

For example, as components and circuits become smaller, their packaging becomes smaller thus allowing manufacturers and designers to more densely populate boards and systems. However, with the smaller packaging and more densely populated boards comes more signal interconnections with less card edge real estate available. Further, the increased signal interconnections increase the required force to make such interconnections. It has become very difficult to create enough mechanical advantage with present docking systems to overcome the high plug forces do to the increased signal interconnections. The forces in some cases are in excess of one hundred pounds which is more than the mechanical advantage available in the present systems employed.

Further, as PCB's are packaged into cassettes, and the cassettes are disposed into frames in ever larger numbers, it becomes important to make the cassettes hotpluggable, so that failed PCB's may be replaced without disrupting the performance of unfailed PCB's. This hotplugable capability means that power tools may not be used to unseat and seat connectors in the PCB's. Thus, speed in plugging large numbers of the cassettes and PCB's is needed to allow a customer engineer to accomplish the required installation of new or failed PCB's and cassettes without undue fatigue.

Accordingly, there is a need to develop enough mechanical advantage to provide the forces and travel necessary to quickly and reliably seat and unseat the mating connectors associated with connecting and disconnecting, respectively, the PCB while maintaining a compact docking cassette.

BRIEF SUMMARY OF THE INVENTION

A docking apparatus for printed circuit boards including a cassette housing so as to define a housing cavity for containing a printed circuit board (PCB) and a linkage mechanism disposed so as to be associated with the cassette housing. The linkage mechanism includes a linkage arm pivotally connected to the cassette housing via a pivot and has a first arm pivotally connected to the PCB, a traveler having a threaded bore therethrough is connected to a second arm extending from the first arm, a shaft threadedly engaged in the left handed threaded bore through the traveler at a first end defining the shaft, the first end configured to operably transfer axial translation of the shaft to the traveler, and an opposite second end defining the shaft threadedly engaged in a right handed threaded bore through a split nut operably secured to the cassette housing. The traveler and nut are configured to threadably receive corresponding threads of the shaft for axial translation of the shaft therethrough, wherein rotation of the shaft translates the shaft causing rapid pivotal movement of the linkage arm about the pivot via the traveler and nut, causing translation of the PCB in and out of engagement with a corresponding connector.

BRIEF DESCRIPTION OF THE SEVERAL VIEWS OF THE DRAWING

These and other objects will be apparent to one skilled in the art from the following detailed description of the invention taken in conjunction with the accompanying drawings in which.

DETAILED DESCRIPTION OF THE INVENTION

The cassette of the present invention is similar to the cassette disclosed in copending U.S. patent application Ser. No. 10/688,525 filed Oct. 17, 2003 for A DOCKING CASSETTE FOR PRINTED CIRCUIT BOARDS, assigned to the assignee of the present application, and incorporated herein by reference.

Figure 1:
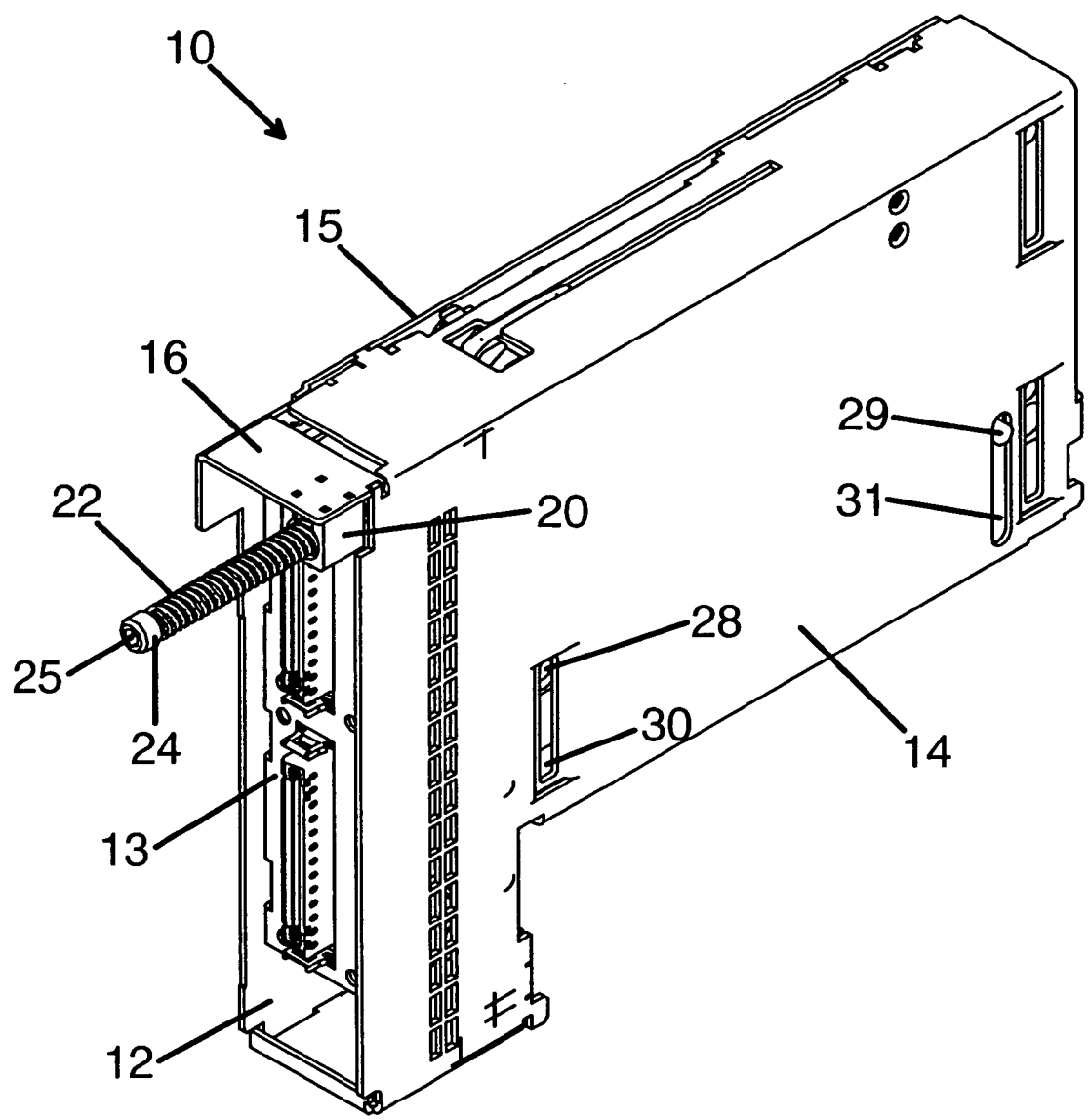
FIG. 1 is a perspective view of a cassette having defined therein a cavity containing a printed circuit board.

FIG. 1 is a perspective view of a cassette 10 having defined therein a cavity 12 containing a carrier 13 for carrying a printed circuit board (PCB). The cassette has a cover 14 and a back 15. The back 15 has a folded over tab 16 to which is welded a split nut 20. A rod 22 is threaded through a threaded bore in the split nut 20. An enlarged head 24 on one end of the rod 22 has a socket 25 into which is inserted a tool such as an Allen wrench to turn the rod 22 to activate the mechanism for seating the PCB, as will be discussed. Projections 28 and 29 extend from the carrier 13 within the cassette 10 through respective slots 30 and 31 to align the carrier 13 as it is moved up and down by the machanism in the cassette 10, as will be discussed.

Figure 2:
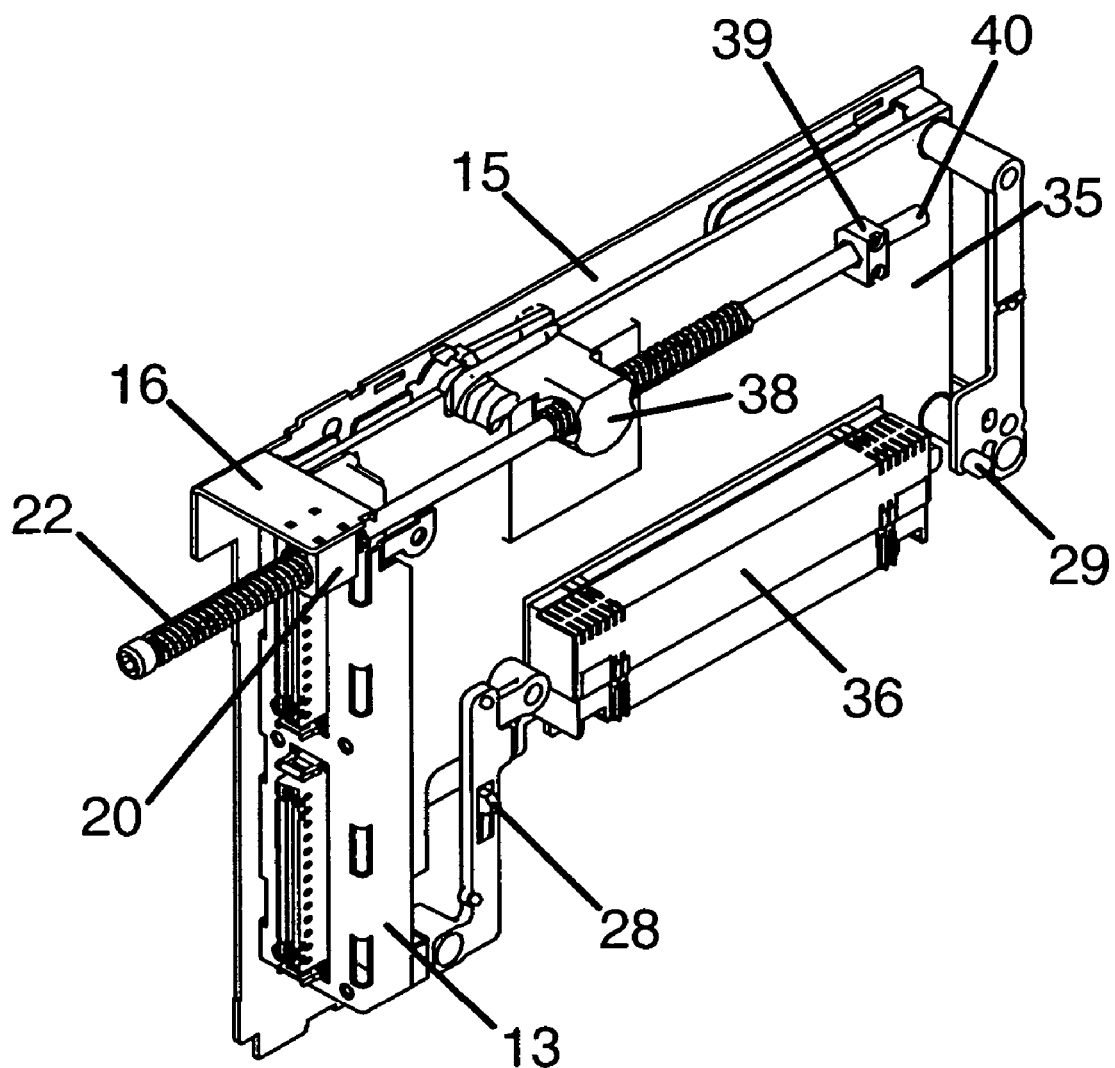
FIG. 2 is a perspective view of the cassette of FIG. 1 with the cover removed.

FIG. 2 is a perspective view of the cassette 10 of FIG. 1 with the cover 14 removed. The carrier 13 carries a PCB 35 on which are mounted electrical components (not shown) and an electrical connector 36. The mechanism, to be described, moves the carrier 13 and PCB 35 downwardly, seating the connector 36 into a corresponding electrical connector (not shown), or upwardly, unseating the electrical connector 36, depending on the rotation of the rod 22, to be discussed. The operating mechanism includes the rod 22, the split nut 20, and a traveler 38, which is free to move backwardly and forwardly as the rod 22 is turned. A guide 39 is attached to the PCB 35, and has a smooth bore for allowing the free end 40 of the rod 22 to move freely therethrough as the rod is moved.

Figure 3:
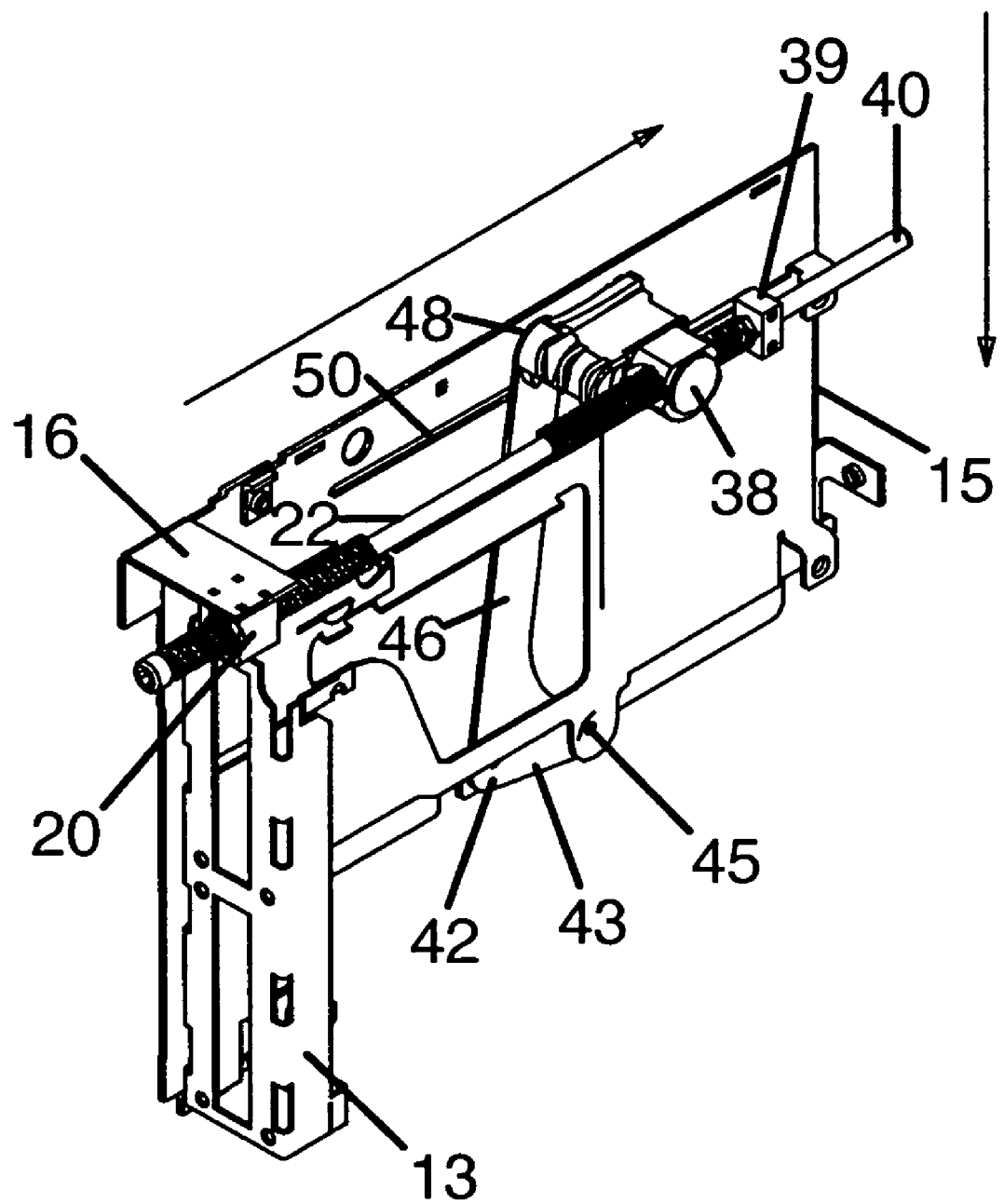
FIG. 3 is a perspective view of the cassette of FIG. 1 with the cover and printed circuit board removed showing the operating mechanism for seating and unseating the printed circuit board.

FIG. 3 is a perspective view of the cassette 10 of FIG. 1 with the cover 14 and PCB 35 removed and the carrier 13 partially cut away, showing the operating mechanism for seating and unseating the PCB 35. The mechanism includes a bell crank 42 having a first arm 43 pivotally connected to the carrier 13 at 45, and a second arm 46 pivotally connected to the traveler 38 at 48. The bell crank 42 has a pin (not shown) extending into a horizontal slot 50 in the back 15 of the cassette 10 to guide the movement of the traveler 38. As will be discussed, the rod is threaded through the split nut 20 and the traveler 38 such that when the rod is rotated in the clockwise direction, the traveler moves toward the right, rotating the bell crank 42 to the right, and moving the carrier 13 downwardly.

Figure 4:
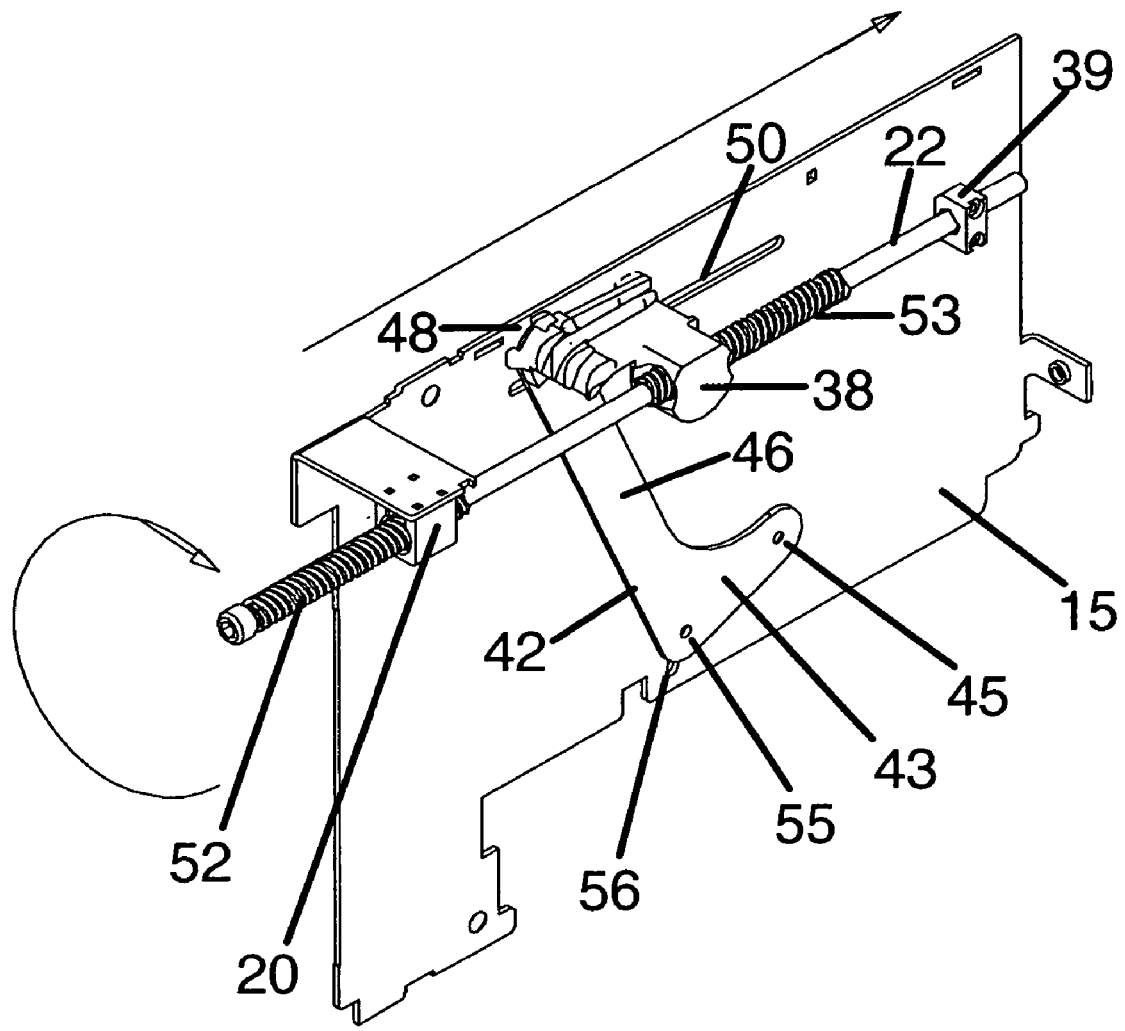
FIG. 4 is a partial view of the operating mechanism of the cassette of FIG. 1.

FIG. 4 is a partial view of the operating mechanism of the cassette 10 of FIG. 1. The rod 22 has a first enlarged portion 52 which is threaded with a right hand thread. Thus, when the rod is turned clockwise, the rod 22 advances in the split nut 20 and moves the traveler 38 toward the right. The rod 22 also has a second enlarged portion 53 which has a left hand thread. Thus, as the rod 22 is turned clockwise, the traveler 38 further moved to the right. It will be understood that the action of both threaded portions 52 and 53 in the split nut 20 and threaded bore in the traveler 38 will act together in an additive action to rapidly move the traveler 38 to the right. The bell crank 42 is pivotally attached by a pin 55 to the back 15. The pin rides in a slot 56 in the back which allows the bell crank 42 to move with respect to the back 15 so that the carrier 13 shown in FIGS. 2 and 3 may move straight down as the traveler 38 is moved to the right.

Figure 5:
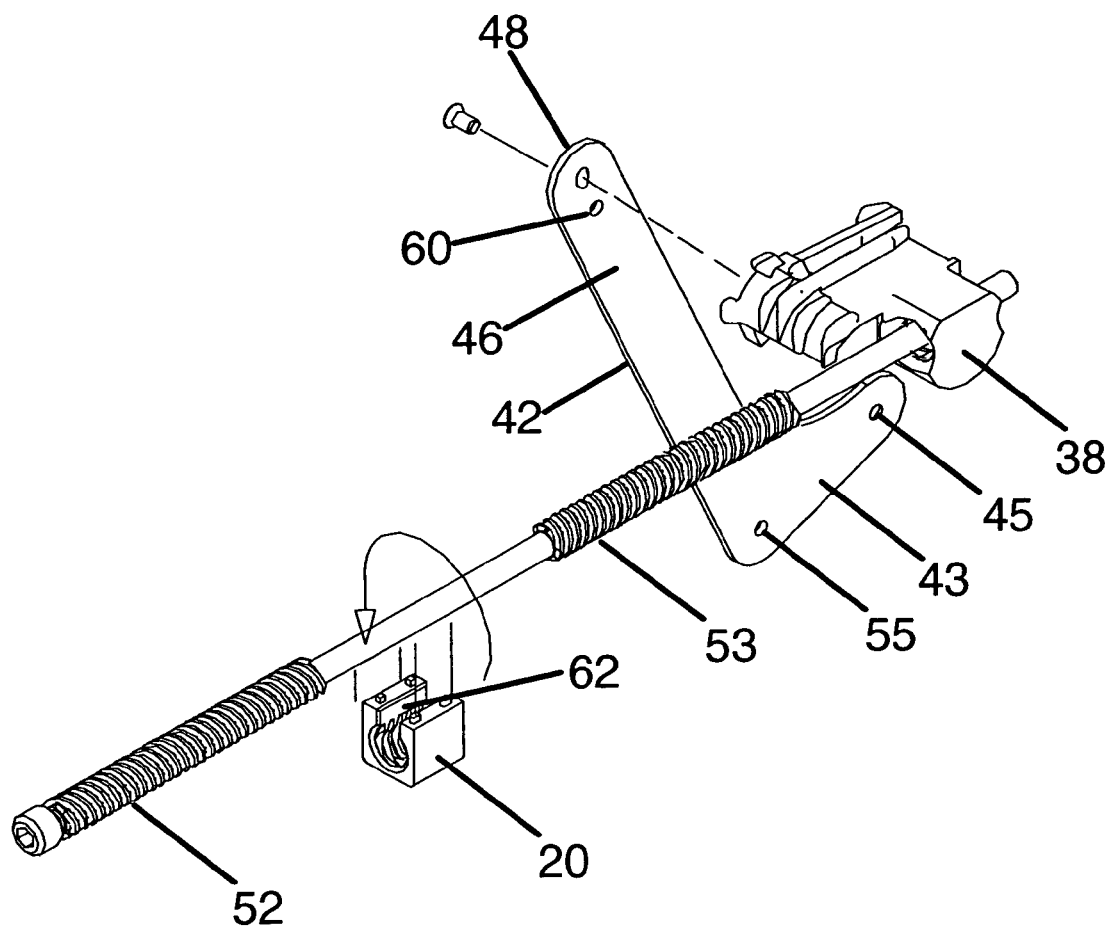
FIG. 5 is a partial exploded view of FIG. 4 showing the action of the rod, bell crank, split nut and threaded traveler.

FIG. 5 is a partial exploded view of FIG. 4 showing the assembly of the rod 22, bell crank 42, split nut 20 and threaded traveler 38. The end 48 of the second arm 46 of the bell crank 42 is pivotally pined to the back of the traveler 38. The pin at the end 45 of the first arm of the bell crank 42 pivotally pins the bell crank 42 to the carrier 13. A pin at 55 extends into slot 56 in the back 15, and a pin at 60 extends into slot 50 in the back 15, to align the movement of the traveler 38 and carrier 13, as explained. The split nut 20 has a slot 62 lengthwise through the split nut 20 which allows the split nut 20 to slip over the reduced portion of the rod between the two threaded portions 52 and 53. The split nut is then threaded onto the threaded portion 52, and then welded to the tab 16, as shown in FIG. 1. It will be understood even though the slot 62 interrupts the threads in the nut 20, there is enough material left around the circumference of the bore through the nut 20 that the operation of the threads 52 and the nut 20 is not affected.

Figure 6:
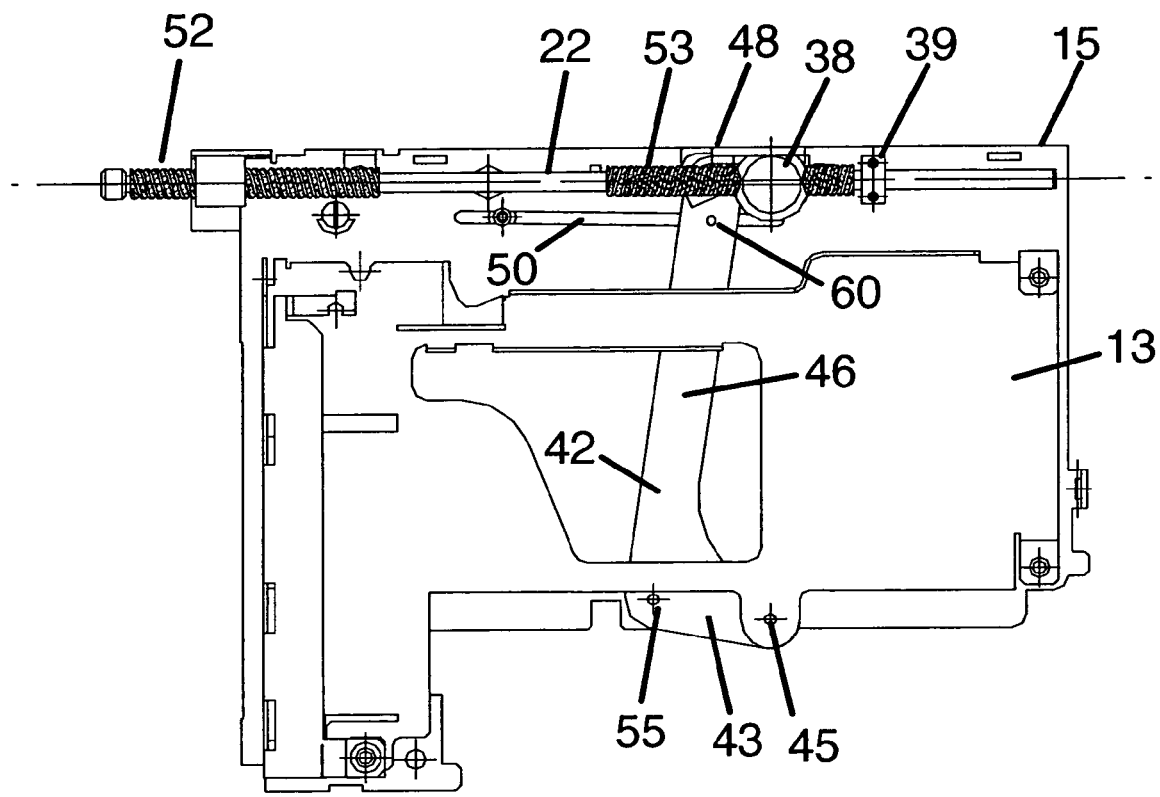
FIG. 6 is a front elevation of the operating mechanism of FIG. 4 showing the operating mechanism in the seated position.

FIG. 6 is a front elevation of the operating mechanism of FIG. 4 showing the operating mechanism in the seated position. The rod 22 is at the full right hand position, moving the end 48 of the second arm 46 fully to the right, and the end 45 of the first arm 43 to the full down position. The pin at 60 of the second arm rides in the slot 50 to the right end of the slot.

Figure 7:
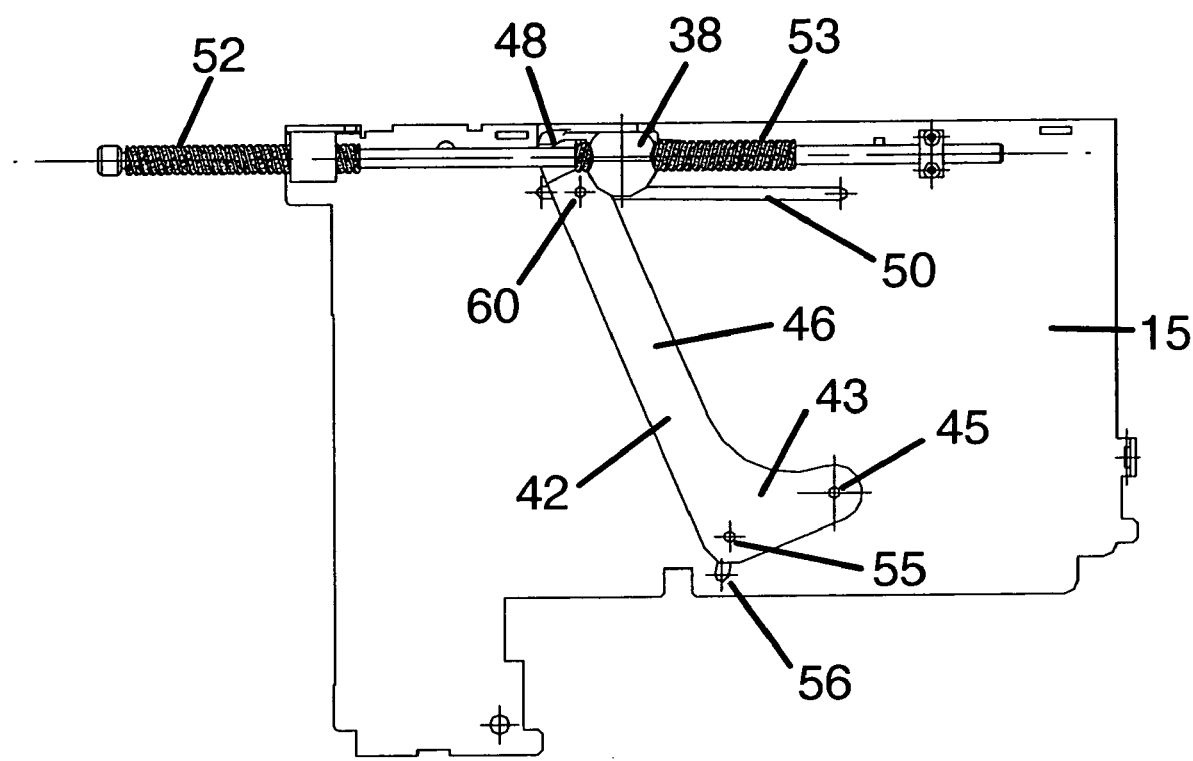
FIG. 7 is a front elevation of the operating mechanism of FIG. 4 showing the operating mechanism in the unseated position.

FIG. 7 is a front elevation of the operating mechanism of FIG. 4 showing the operating mechanism in the unseated position. In this position, the rod 22 is at the fully left or unscrewed position. The end of 48 of the second arm 46 is fully to the left, and the end 45 of the first arm is full up, unseating the connector 36 of the PCB 35 in the carrier 13. The pin at 60 is at the left end of the slot 50, and the pin 55 is at the top of the slot 56.

Figure 8:
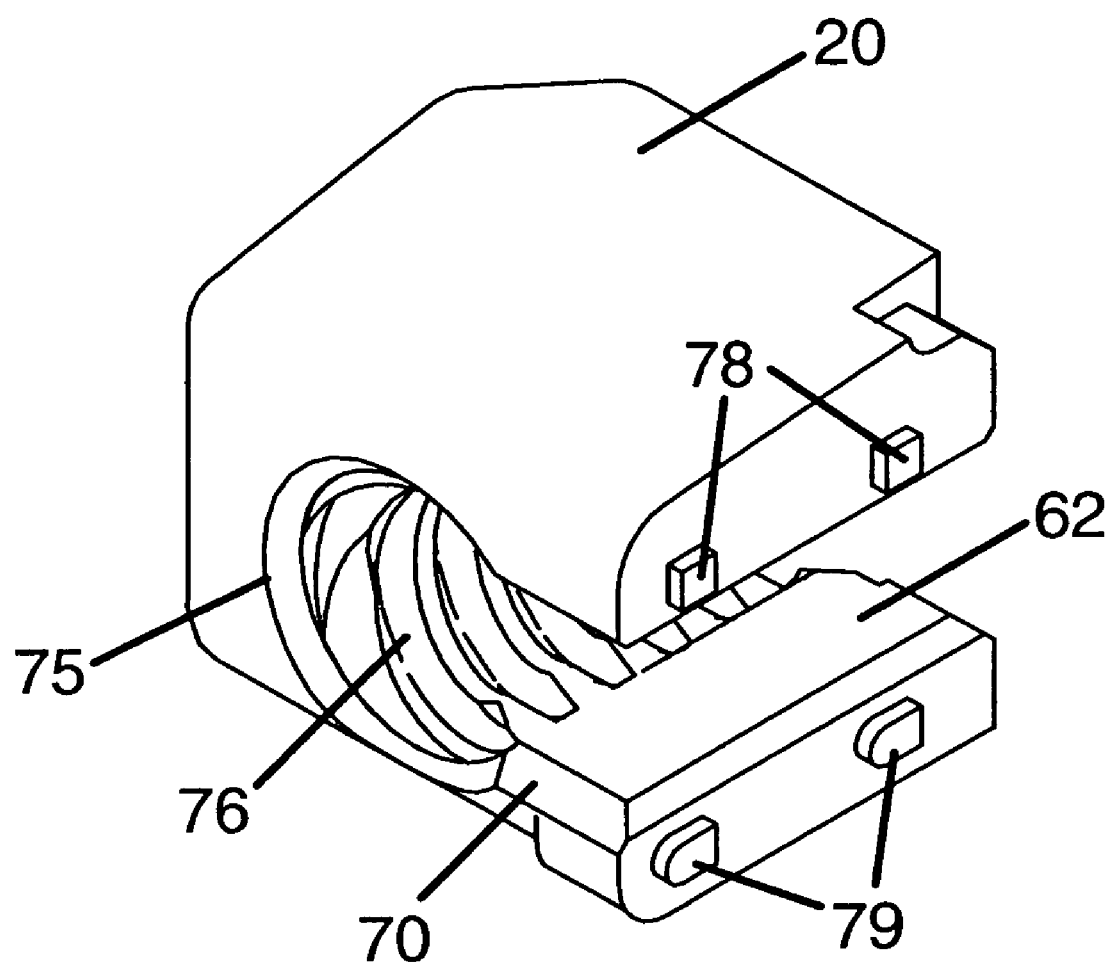
FIG. 8 is a perspective view of the split nut of the operating mechanism of FIGS. 4–7.

FIG. 8 is a perspective view of the split nut 20 of the operating mechanism of FIGS. 4–7. The split nut 20 includes a slot 62 lengthwise through the nut 20. As mentioned previously, there is enough material 70 around the circumference of the bore 75 of the nut 20, that the action of the threads 76 of the nut 20 function correctly with the threaded portion 52 of the rod 22. The split end of the nut 20 is flattened and contains projections 78 and 79 which fit into corresponding holes in the tab 16. The projections 78 and 79, and the corresponding holes may be polarized, if desired.

Figure 9:
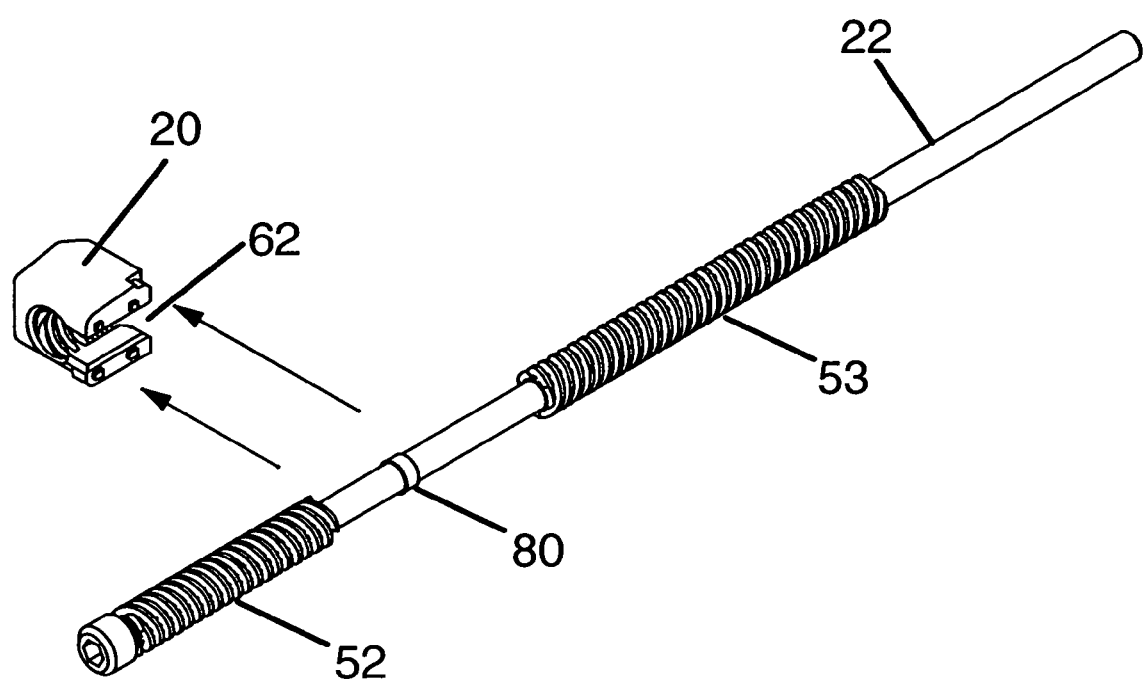
FIG. 9 is an exploded view showing the split nut and rod of the operating mechanism of FIG. 4.

FIG. 9 is an exploded view showing the split nut 20 and rod 22 of the operating mechanism of FIG. 4. The slot 22 is sized such that the split nut 20 may be slipped over the rod 22 and threaded into place. If desired, an enlarged ring 80 may be formed around the circumference of the rod 22 intermediate the threaded portions 52 and 53. A spring (not shown) may be trapped between the ring 80 and the back side of the nut 20, to provide tension on the rod, to urge the rod toward the unseated position, assisting in the smoothness of the action of the operating mechanism.

Figure 10:
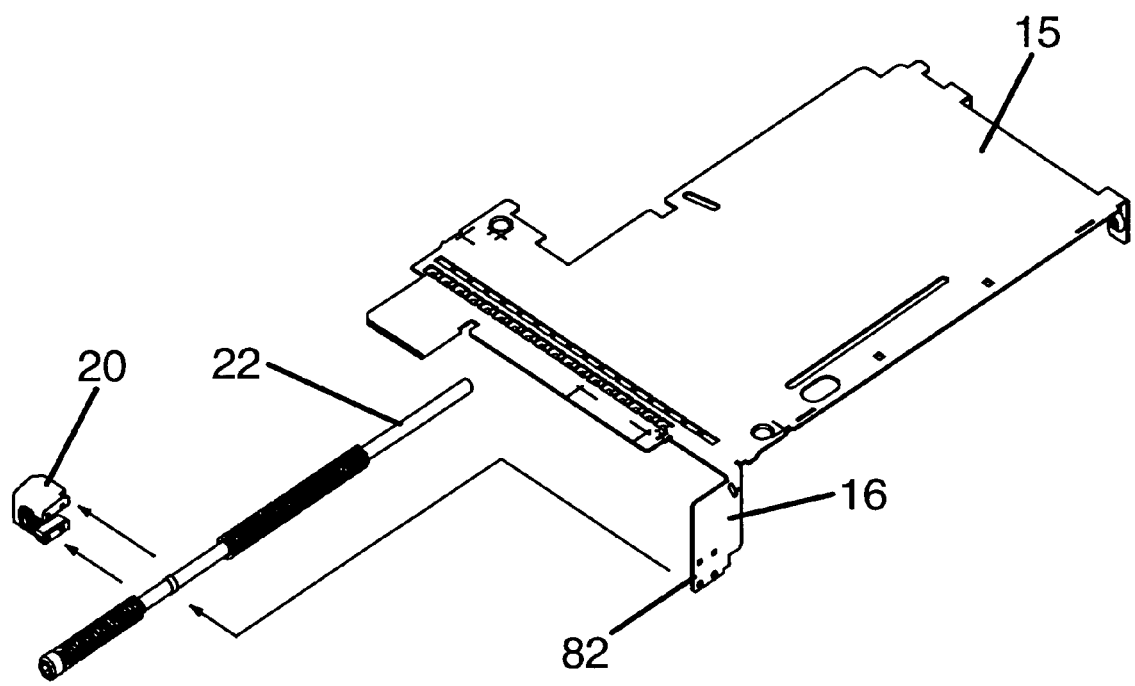
FIG. 10 is an exploded view showing the rod, split nut and back of the cassette of FIG. 1.

FIG. 10 is an exploded view showing the rod 22, split nut 20 and back 15 of the cassette 10 of FIG. 1. After the split nut 20 is placed on the rod 22 and threaded into place, the flat face of the split nut 20 is fastened to the tab 16 of the back 15. This may be done by welding, epoxy, or any other method desired. The tab 16 may include holes 82 corresponding to the projections 78 and 79 to properly align the split nut 20 on the tab 16.

The use of the multiple cassettes 10 in a frame are shown and explained in the aforementioned Ser. No. 10/688,525 patent application.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. A split nut for use with a rod having dual directional screw threads about a common diameter, the split nut comprising:

a body having a threaded bore therethrough, said treaded bore for threadedly engaging with one of the screw threads of the rod;

said body having a body opening through one side of said body interrupting the threads in said threaded bore in such a way that a portion of the rod intermediate the dual screw threads may pass through said body opening;

said threaded bore operable for threadedly engaging with one of the screw threads of the rod such that rotation of the rod in one direction advances the rod into the threaded bore, and rotation of the rod in the other direction withdraws the rod from said bore; and said side of the split nut having said body opening also having a flat face for attaching to a fixed surface such that said split nut does not rotate when a rod threadedly engaged with said threaded bore is rotated and wherein said flat face includes at least one projection which registers with at least one body opening in said fixed surface.

2. The split nut of claim 1 wherein when said flat face is fixed to said fixed surface, and said body opening is covered such that the rod cannot pass through the opening.

3. The split nut of claim 1 wherein the projection and body opening are polarized such that the split nut may be attached to the fixed surface in only one way.

4. The split nut of claim 1 wherein said flat surface is attached to said fixed surface by welding.

5. A method for placing a split nut on a rod having dual directional screw threads about a common diameter, the method comprising:
provide the body of the split nut with a threaded bore therethrough, the threaded bore for threadedly engaging with one of the screw threads of the rod;
providing an opening through one side of the body interrupting the threads in said treaded bore;
passing a portion of the rod intermediate the dual screw threads through the opening; and
threadedly engaging with one of the screw threads of the rod with the threaded bore such that rotation of the rod in one direction advances the rod into the threaded bore, and rotation of the rod in the other direction withdraws the rod from the bore; and
attaching a flat face on the side of the split nut having the opening to a fixed surface such that the split nut does not rotate when a rod threadedly engaged with the threaded bore is rotated said attaching comprising inserting at least one projection extending from said flat face into at least one corresponding opening in said fixed surface.

6. The method of claim 5 wherein when said flat face is fixed to said fixed surface, said opening is covered such that the rod cannot pass through the opening.

7. The method of claim 5 further comprising polarizing the projection and the corresponding opening such that the split nut may be attached to the fixed surface in only one way.

8. The method of claim 5 further comprising welding said flat surface to said fixed surface.

* * * * *